(No Model.)
J. PEHRS.
ANIMAL RELEASING DEVICE.
No. 354,023. Patented Dec. 7, 1886.
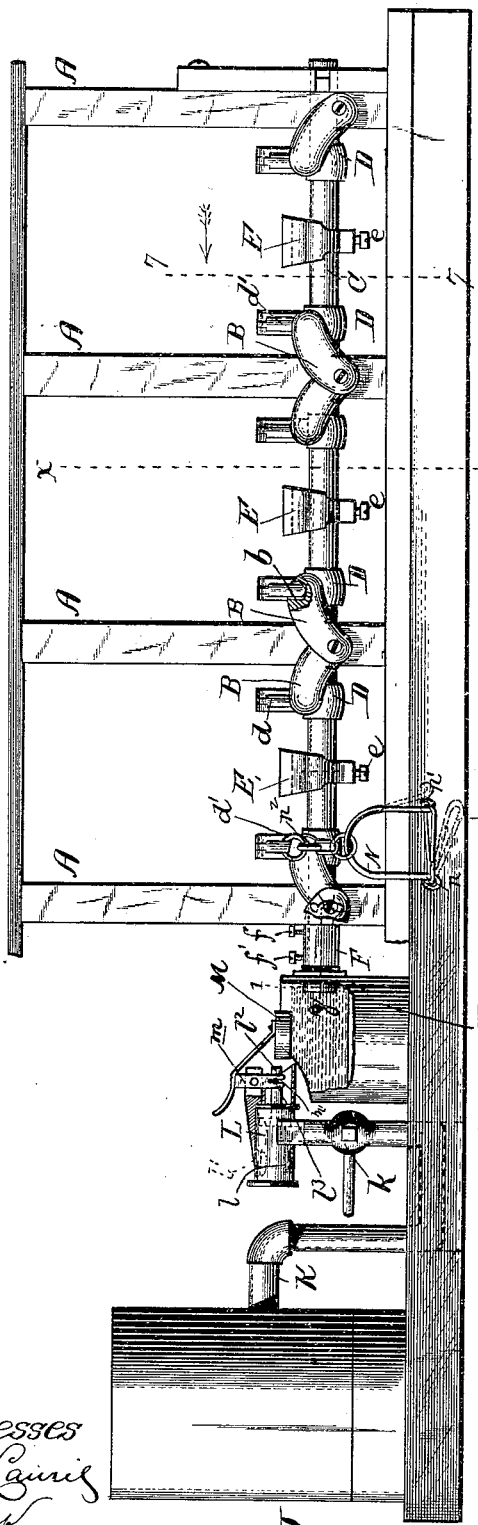
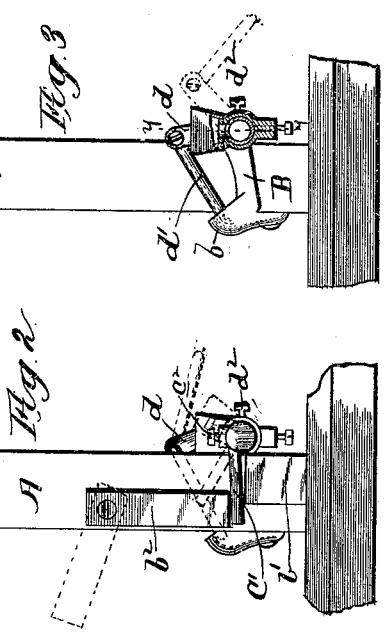
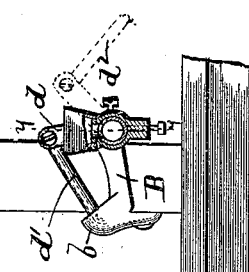
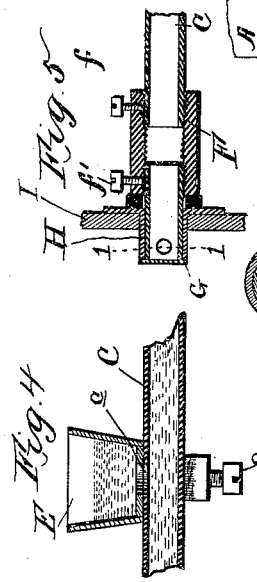
Witnesses
Inventor
Julius Pehrs
By R.S. & A.P. Lacey
Atty

UNITED STATES PATENT OFFICE.

JULIUS PEHRS, OF DENISON, IOWA.

ANIMAL-RELEASING DEVICE.

SPECIFICATION forming part of Letters Patent No. 354,023, dated December 7, 1886.

Application filed September 6, 1886. Serial No. 212,842. (No model.)

*To all whom it may concern:*

Be it known that I, JULIUS PEHRS, a citizen of the United States, residing at Denison, in the county of Crawford and State of Iowa, have invented certain new and useful Improvements in Animal-Releasing Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for releasing and watering stock, and has for its object to devise a simple construction, by which stock may be haltered singly and released at one and the same operation in case of fire, or for other purposes, and also has for its object to combine therewith a simple means for watering the stock while so haltered.

The improvement consists in combining with the uprights forming the stall a tubular rotatable releasing-shaft, arranged horizontally and journaled to said upright, and which is made to convey water to each of the stalls, all as will be more fully hereinafter set forth and claimed, and shown in the annexed drawings, in which—

Figure 1 is a side elevation of my device, parts broken away. Fig. 2 is an end view of the same. Fig. 3 is a section on the line X X of Fig. 1; Fig. 4, a section on the line Y Y, Fig. 3. Fig. 5 is a section on the line Z Z of Fig. 1. Fig. 6 is a section on the line 1 1 of Fig. 5; and Fig. 7 is a section on the line 7 7 of Fig. 1, looking in the direction of the arrow.

The uprights A have castings B bolted to their sides near the lower ends, the outer ends of which form bearings for the tubular shaft C, which has a partial rotary movement. The inner ends of the castings are extended laterally, and have sockets $b$ formed in their upper sides, for a purpose presently to be described. A flange or lip extending in an opposite direction from the extended end extends over the edge of the uprights and gives greater stability to the castings.

Sleeves D, mounted upon the tubular shaft directly opposite the extended ends of the castings, have arms $d$, extended upwardly, to the ends of which links $d'$ are pivotally secured, and have their free ends adapted to enter the sockets $b$ of the extended ends of the castings B. These sleeves are adjusted by a set-screw, $d^2$, in such manner that they may have an independent movement about the tubular shaft, so as to release or disengage the ends of the links from the socketed ends of the castings B.

The shaft C has openings $c$, formed at intervals through its upper side, and troughs E are held or secured upon the shaft at points directly opposite the openings $c$, and communicate with the interior through said openings. Said troughs are sleeved upon the shaft and adjustably held thereon by set screws $e$. The openings and the troughs are located preferably between each two uprights, so that two head of stock may be supplied from one trough.

The outer end of the tubular shaft C is provided with a lever, $c'$, adjustably secured by set-screws $c^2$, for the purpose of rotating the shaft when it is desired to release all the stock at one time. A stop, $b'$, secured to a side of the end upright limits the downward movement of the lever. Directly above the stop is pivoted a latch, $b^2$, which engages with the lever and holds it down upon the stop and prevents any movement of the shaft C when so locked. The inner end of the shaft has a sleeve, F, screwed thereon and held by set-screw $f$. The short tube G, closed at its outer end, is screwed into the outer end of the sleeve F, and is held by the set-screw $f'$. Its outer end passes through a sleeve or thimble, H, passed through and secured to a side of the tank I, located at the end of the series of stalls. The sleeve H has an opening, $h$, formed in its under side, and the tube G has a corresponding opening, $g$, to register therewith when the shaft C is turned in such position that the troughs occupy a vertical position.

The tops of the troughs are on a level with the top of the tank, or at such a height relative thereto that the water therein and in the troughs will be on the same level without any danger of the troughs overflowing. The water in the tank is maintained at a certain level by means presently to be described.

In practice, when the tubular shaft C is turned so as to release the stock, communication is cut off between the tank and the tubular shaft by reason of the openings $g$ $h$ being thrown out of register; but when the shaft is turned into its normal position communication is again established and the troughs are supplied, as will be readily understood.

The tank I may be supplied from any suitable source, and for the purpose I have shown a reservoir, J, which is connected with it by the pipes K, and has the flow of water regulated by valves $k$. The discharge end of the pipes K is provided with a tubular spout, L, arranged in a horizontal position, which is closed at one end and has a valve-seat, $l$, formed at its outer end, against which the valve $l'$ is seated to close the opening and shut off the supply when the water has reached the required level in the tank I. This valve is automatically operated by a float, M, arranged to work in the tank I, and has a depending arm, $m$, by which it is pivoted to the upper side of the spout L. The lower end of the arm $m$ is bifurcated to receive the stem $l^2$ of the valve, and is provided with a transverse slot, $m'$, to receive the pin $l^3$, passing transversely through the valve-stem. By this means a positive connection is formed between the valve and float in such manner that when the float rises, the valve will be closed and shut off the supply of water from the reservoir to the tank, and will be opened when the float sinks or falls by reason of the sinking or falling of the water in the tank.

Each of the links $d'$ may be provided with a halter, to secure the animal, which consists of a yoke, N, having a latch, $n$, pivoted at one end and adapted to be sprung over a hook, $n'$, on the opposite end, and a chain, $n^2$, secured at one end to the yoke and adapted to be secured at its other end to the said link $d'$. Thus the animals may be haltered either by releasing the latch $n$ from the hooked end $n'$ and slipping the yoke over the animal's neck and again fastening the latch, or by loosening the sleeve D and turning it, which will release the end of the link from the socket, when the end of the chain $n^2$ may be slipped over the link and the sleeve returned to its position and held there by tightening the set-screw previously loosened. When it is desired to release all the stock by one operation, the tubular shaft C is turned in its bearing by means of the lever $c'$.

From the foregoing the operation of the device can be readily understood, and it is evident that as far as the castings, the sleeves D, and the links are concerned the shaft C can be made solid; but for the effective operation of the device, and for the purposes of watering the stock when haltered, the construction shown and described is preferred.

Having thus described my invention, what I claim, and desire to secure by Letters Patent is—

1. The combination, with the upright, the casting secured alongside thereof, having its front end extending laterally in opposite directions, one of the extensions overlapping the front edge of the upright, the other extension having a socket therein and its rear end projected beyond the rear edge of the upright, of the releasing-shaft mounted in the latter end of said casting, the sleeve having an arm adjustably secured upon the shaft, and the link pivotally connected with the outer end of the arm and adapted to fit into said socket, substantially as and for the purpose described.

2. The combination of the uprights, the castings B, secured thereto, as shown, each having one end extended and provided with a socket, and the other end extended beyond the edge of the upright and forming bearings, a shaft mounted in said bearings, and the links pivotally connected therewith at one end and having their free ends adapted to engage with said socketed ends, as and for the purposes set forth.

3. The combination of the tank having a thimble or sleeve secured to a side thereof and having an opening in its side, a short tube fitted therein, closed at its inner end and having an opening formed through its side to register with the opening in said thimble, the tubular releasing-shaft secured to the outer end of the short tube, and the troughs secured thereupon, substantially as and for the purpose described.

4. In a releasing device, the combination of a water-supplying reservoir, the tank, and means, substantially as described, for releasing the supply of water to the tank, the tubular releasing-shaft connected with the tank, communicating therewith, and adapted to have said communication cut off by a partial rotation of the shaft, which at the same time releases the stock, and the troughs located at intervals upon said shaft, as and for the purpose set forth.

In testimony whereof I affix my signature in presence of two witnesses.

JULIUS PEHRS.

Witnesses:
I. T. ROBERTS,
JUSTEN TRUNKE.